UNITED STATES PATENT OFFICE.

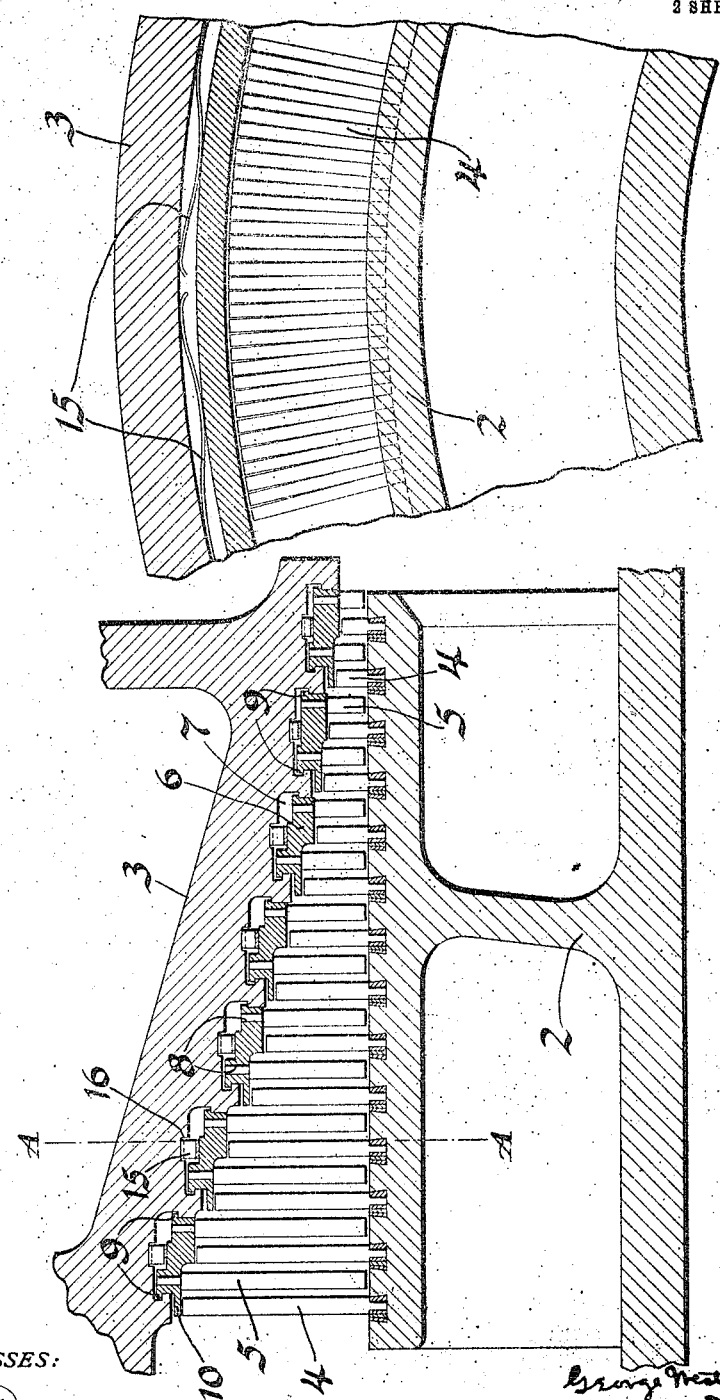

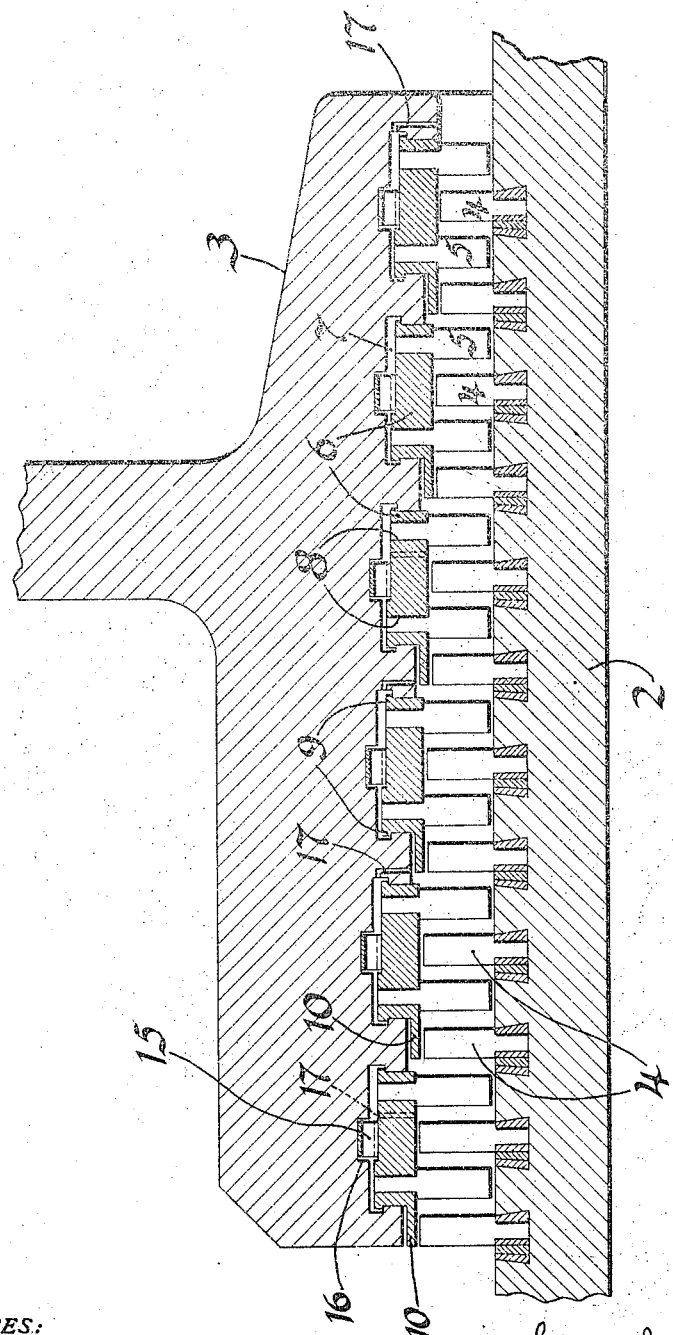

GEORGE WESTINGHOUSE, OF PITTSBURG, PENNSYLVANIA.

TURBINE-BLADING.

998,820.  Specification of Letters Patent.  Patented July 25, 1911.

Application filed October 4, 1907, Serial No. 395,924. Renewed May 13, 1908. Serial No. 432,699.

*To all whom it may concern:*

Be it known that I, GEORGE WESTINGHOUSE, a citizen of the United States, and a resident of Pittsburg, in the county of Allegheny and State of Pennsylvania, have made a new and useful Invention in Turbine-Blading, of which the following is a specification.

This invention relates to elastic fluid turbines and more particularly to holding means for the stationary blades of such machines.

In certain types of turbines it is necessary to maintain close working clearances between the revolving and stationary elements in order to obtain high efficiency. These close clearances are a source of difficulty and trouble for the reason that the rotors and stators of turbines are liable to and under certain operating conditions, do distort. These distortions may result from variations of temperature throughout the working passages of the turbine and a consequent inequality of temperature strains set up in the metal of the stator or rotor; or inherent strains may be set up within the stator by calking the stationary blades in place, which cause the stator to warp and distort when it is subjected to variations of temperature. Besides the liability of distortion, the tendency of the rotor, to rotate at high speeds about its gravity axis instead of its geometric axis is a source of trouble.

An object of this invention has been to overcome the trouble which arises from the necessary small clearances and the above mentioned distortions of the rotors and stators of turbines.

A further object of this invention has been the production of a blade holding element for turbines which obviates the necessity of calking the blades in place and therefore decreases the tendency to distort of the blade holding elements.

I accomplish the first of these objects by mounting the stationary blades of the turbine on the turbine stator or casing in such a manner that they are capable of moving radially to accommodate themselves to variations in the relative positions of the rotor and stator and in also providing clearance-determining strips, for the outer or free ends of the rotating blades, which move with the stationary blades to accommodate the varying positions of the relatively rotating part.

I accomplish the second object by providing blade holding elements which are located in undercut channels or grooves formed in the blade carrying members of the turbine and which are secured in place by means of springs or their equivalents.

In the drawings accompanying this application and forming a part thereof: Figure 1 is a fragmentary section of a turbine and illustrates an embodiment of my invention; Fig. 2 is a section along the line A—A of Fig. 1; and Fig. 3 is a partial longitudinal section of a turbine illustrating a modification of my invention.

The turbine illustrated as embodying my invention comprises a rotor 2, a stator, or inclosing casing 3 and alternate rows of moving and stationary blades 4 and 5, which are respectively mounted on the rotor and stator of the turbine. The moving blades are secured in any suitable manner in grooves or channels provided for that purpose in the rotor and the stationary blades 5 are mounted in segments of a ring or arc shaped base pieces 6, which are secured in place in undercut channels or grooves 7 formed in the stator. These base pieces are rolled or drawn to the desired section and are preferably cut and formed into semi-circular segments, each of which is provided with two rows of radially extending and circumferentially alined holes 8, into which the stationary blades are mounted in any suitable manner. The rows of blades of each base piece are so spaced that they coöperate with the moving blades mounted on the rotor in the delivery of motive fluid.

Each semi-circular base piece is so mounted within one of the grooves 7 that it is capable of a certain amount of transverse motion relative to the stator, in a plane perpendicular to the axis of the rotor. I accomplish this by providing a circumferentially-extending and laterally-projecting flange 9 on each side of each base piece. These flanges coöperate with the shoulders formed by the undercut portion of the grooves 7 in holding the base piece in place and at the same time permit of a certain amount of play. The body portion proper of each base piece 6 forms a sliding fit with the walls of the narrower portion of the grooves 7 and the flanges are of such thickness relative to the depth of the undercut portion of the groove that the base piece is capable of moving inwardly relative to the groove. The portion of each base piece which projects out of the groove 7 is provided on one side with a circumferentially-extending flange 10, which projects laterally into close proximity with the outer or free ends of an adjacent row of blades 4 and forms a clearance-determining strip for those blades and a protecting strip for the blade-mounting element.

That portion of the peripheral face of the base strip adjacent to the outer or free ends of the row of blades 4, which is located and operates between the two rows of blades 5 carried by the strip, forms a clearance-determining surface for the moving blades.

Each base strip is yieldingly held in an operating position by means of a flat spring, or a plurality of flat springs 15, which are mounted in a slot 16 cut in the inner wall of each groove 7 and which operate between the stator and the base piece to force the flanges 9 into contact with the shoulders formed by the undercut portion of the grooves 7.

Each base piece is so constructed and its blades are so arranged that when the flanges 9 are held against the shoulders formed by the undercut portions of the grooves 7, the stationary blades carried by the base piece project into close proximity with the turbine rotor and maintain a desired clearance and one which is equal to the clearance between the outer or free ends of the moving blades and the base piece. With such a construction, if for any reason the relative positions of the rotor and stator are disturbed and the clearances which it is desired to maintain are destroyed by the rotor contacting with the free ends of the stationary blades or the stator coming in contact with the free ends of the rotating blades, the base pieces 6 will move radially outward, under the influence of the contacting force, and flatten a number of the springs 15 and thereby prevent any serious disturbance. Under such conditions the free ends of the stationary blades will be yieldingly held in contact with the rotor and the base pieces will be yieldingly held in contact with the outer or free ends of the rotor blades.

By cutting the base pieces 6 into semi-circular segments, or even into smaller segments, a portion only of the blades of each row of stationary blades will be disturbed by a displacement of the rotor or stator and the remaining blades will be held by their springs to maintain as nearly as possible the desired working clearance.

In order that the spring 15 may not be compelled to operate against the pressure of the motive fluid, series of holes 17 are provided in the stator, or in each base piece 6, which connect the undercut portion of each of the grooves 7 with the working passages of the turbine. These holes admit working fluid around the mounting pieces 6 so that they are about balanced with reference to fluid pressure.

In Fig. 1, I have shown an embodiment of my invention utilized in connection with a turbine in which the blades of each successive row are longer than the blades of each preceding row. Each base strip is therefore constructed to accommodate the mounting of two rows of stationary blades 5 of different lengths and is also arranged to form a clearance-determining strip for two rows of moving blades 4 of different lengths.

In Fig. 3, I have shown an embodiment of my invention in which the blades 5 of each of the two rows mounted on the same base strip are of the same length and each piece is constructed to form a clearance-determining strip for two rows of blades 4 of the same length. I also contemplate using base strips carrying three or more rows of blades and for that reason I do not wish to limit myself to the absolute construction shown.

In some instances it may be desirable to so construct the base strips 6 that there is no clearance between the turbine rotor and the ends of the stationary blades 5 and between the base strips 6 and the ends of the moving blades 4. Under such conditions the base strips will be yieldingly pressed against the outer or free ends of the blades 4 and the stationary blades 5 will be yieldingly held against the peripheral surface of the rotor until they are ground down and a minimum clearance is obtained.

The clearances may be adjusted from time to time by cutting down the shoulders formed by the undercut portions of the grooves 7.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In combination with the rotor of a turbine and annular rows of blades mounted thereon, a stator, blade carrying elements, a plurality of circumferentially-extending rows of stationary blades mounted on each of said elements and means for mounting said elements on said stator whereby said stationary blades are capable of substantially radial motion.

2. In combination with the rotor of a turbine and annular rows of blades mounted thereon, a stator, blade carrying elements therefor, a plurality of circumferentially-extending rows of stationary blades mounted on each of said elements and means for mounting said elements on said stator whereby said stationary blades are capable of transverse motion relative to said stator and in a plane perpendicular to the axis of said rotor.

3. In a turbine, a rotor, annular rows of blades carried thereby, a stator, and a blade-carrying element mounted on said stator and yieldingly held in place and forming a clearance-determining strip for two rows of rotor blades.

4. In a turbine, a rotor, annular rows of blades carried by said rotor, a stator, and a blade-holding member mounted on said stator and forming a clearance-determining strip for two rows of rotor blades.

5. In a turbine, a blade holding member mounted on a blade-carrying element of said turbine, blades mounted on said member and arranged in a plurality of circumferentially-extending rows, and means whereby said blade-carrying member is capable of transverse motion in a plane perpendicular to the axis of the turbine.

6. In a turbine, a blade-carrying element provided with a blade mounting slot, a plurality of blades assembled in two rows, a blade mounting strip for said blades adapted to be secured into said slot, and a clearance-determining strip formed integrally with said blade mounting strip.

7. In a turbine, a blade-carrying element provided with a blade mounting slot, a plurality of blades assembled in two rows, a blade mounting element adapted to be secured in said slot and means whereby said blade mounting element is yieldingly held in place.

8. In a turbine, a blade-mounting element provided with a slot, a plurality of blades assembled in two rows, a blade mounting element for said blades, and means for mounting said blade-mounting element in said slot whereby said blades are capable of transverse motion relative to said blade carrying element.

9. In combination with a turbine element provided with an undercut groove, a blade foundation member slidably mounted within said groove and a plurality of rows of blades carried by said member.

10. In combination with a turbine rotor element carrying an annular row of blades, a stator element provided with a groove lying opposite said row of blades, a blade foundation member removably mounted within said groove, and two rows of blades carried by said member and located on opposite sides of the row carried by the rotor element.

11. In combination with a turbine rotor element provided with an annular row of blades, a stator element provided with an undercut groove in line with said row of blades, a removable blade foundation member in said groove and provided with two rows of blades and means for yieldingly holding said foundation member toward said rotor.

In testimony whereof, I have hereunto subscribed my name this 30th day of September, 1907.

GEO. WESTINGHOUSE.

Witnesses:
CHARLES W. McGHEE,
E. W. McCALLISTER.